Figure 1:
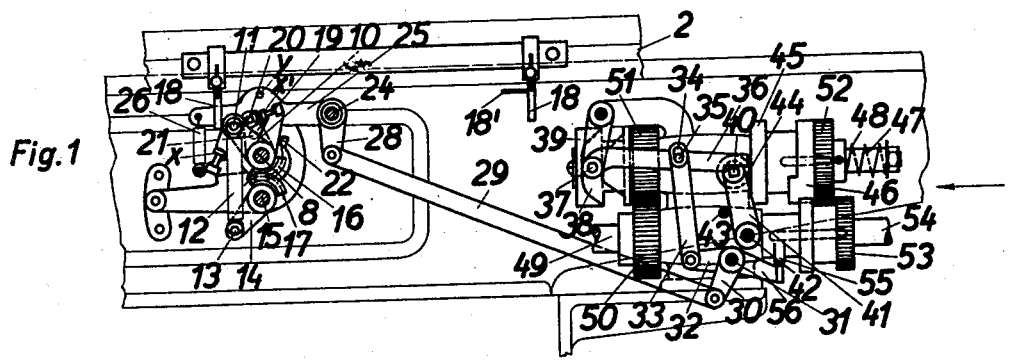

July 21, 1931.  K. METZLER  1,815,112

TOOL GRINDING MACHINE

Filed Feb. 13, 1930  2 Sheets-Sheet 1

K. Metzler
INVENTOR

By: Marks & Clerk
ATTYS.

July 21, 1931.  K. METZLER  1,815,112
TOOL GRINDING MACHINE
Filed Feb. 13, 1930   2 Sheets-Sheet 2
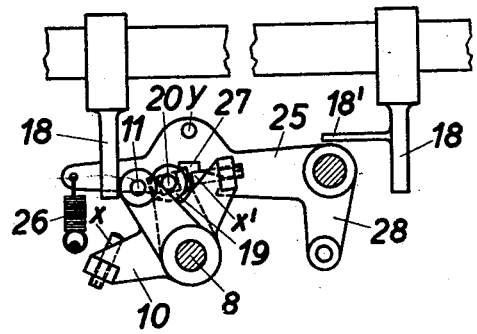
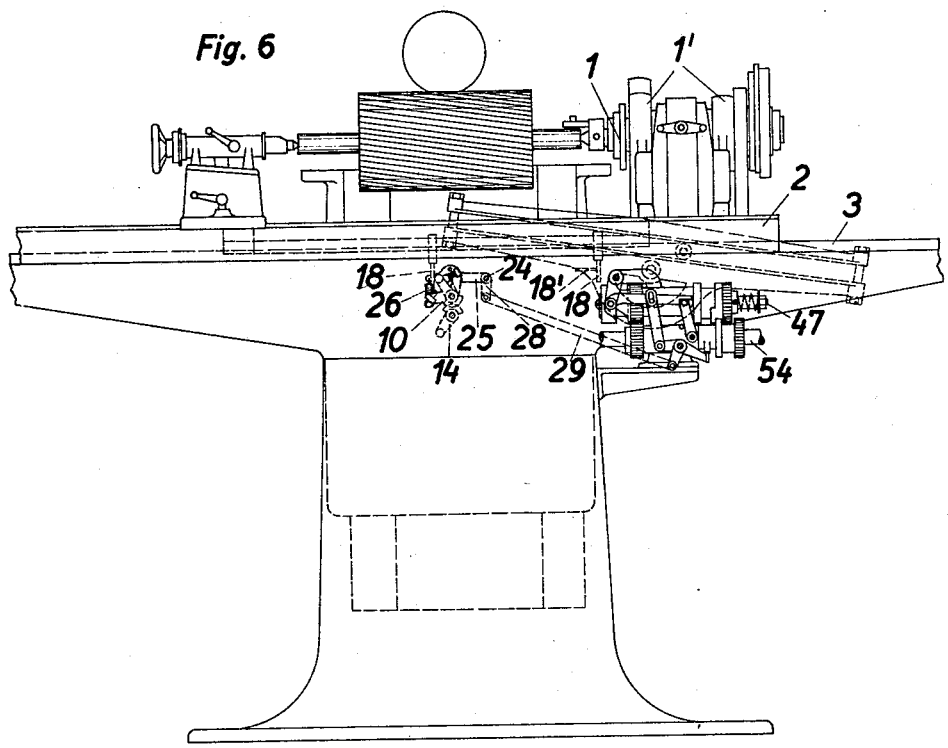

Patented July 21, 1931

1,815,112

UNITED STATES PATENT OFFICE

KURT METZLER, OF GROSSENHAIN, GERMANY

TOOL GRINDING MACHINE

Application filed February 13, 1930, Serial No. 428,191, and in Germany February 25, 1929.

Tool grinding machines are known, more particularly for grinding milling cutters with helical cutting edges, in which the spindle carrying the tool is carried by a holder reciprocating in the longitudinal direction of the spindle. This holder is equipped with a slide piece displaceable transversely to the longitudinal direction of the spindle, this slide piece being controlled during the reciprocation of the spindle holder, by a stationary cam or the like, for transverse displacement, which is converted into a rotation of the spindle. The driving is effected from a continuously revolving shaft, from which, by means of a reversing gear, the reciprocation of the tool spindle holder is obtained. The throwing over of the coupling member of the reversing gear then proceeds mechanically by means of tappets or the like arranged in the workpiece spindle holder in a manner known in itself.

In this manner the result is obtained that the grinding tool can act upon the cutting surfaces of the milling cutter located in the gaps between the teeth during the motion of the tool spindle holder in both directions, the spindle following the turns of the cutting edges by rotation. The problem arises of automatically effecting a further feed through on tooth division, that is, from one gap between teeth to the next, every time the tool passes the grinding tool in its reciprocation.

For this purpose two clutches are provided, one for the displacement of the tool spindle holder and the spindle rotation obtained therefrom, and the second for the spindle feed, and are so connected with one another that upon the first clutch shifting into the neutral position at the termination of a reciprocation of the tool spindle holder the second clutch is closed, and after the completion of one revolution of the feed spindle the first clutch is automatically closed and the second clutch opened.

The clutch member of the change speed gear acting upon the tool spindle holder is preferably shifted at the termination of the reciprocation of the spindle holder into the neutral position by the latter, and in this position is held fast against the action of a spring or the like by a spring snap bolt or the like. The resilient locking catch that has passed into the operative position shifts the second clutch acting upon the feed spindle into the operative position by means of rodding connected therewith, so that the continuously revolving driving shaft is placed in connection with the feed mechanism of the spindle, this being done in such a way that at the termination of one revolution of the driving shaft the locking bolt of the change gear is withdrawn from the driving shaft, and the clutch member of the first clutch is closed by the spring action.

Figure 2:
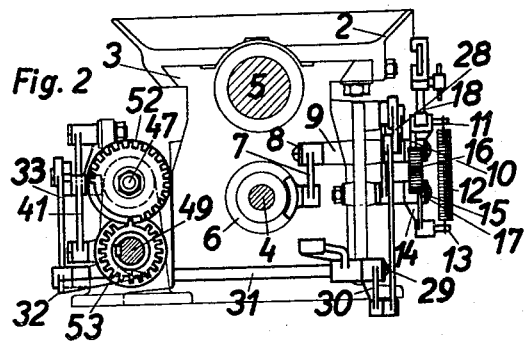
Figure 3:
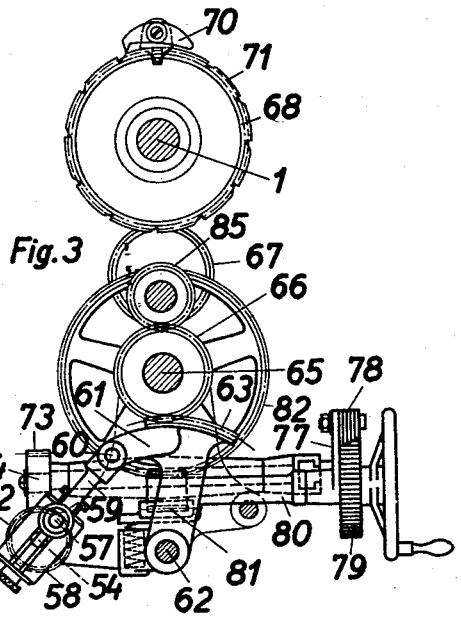
Figure 4:
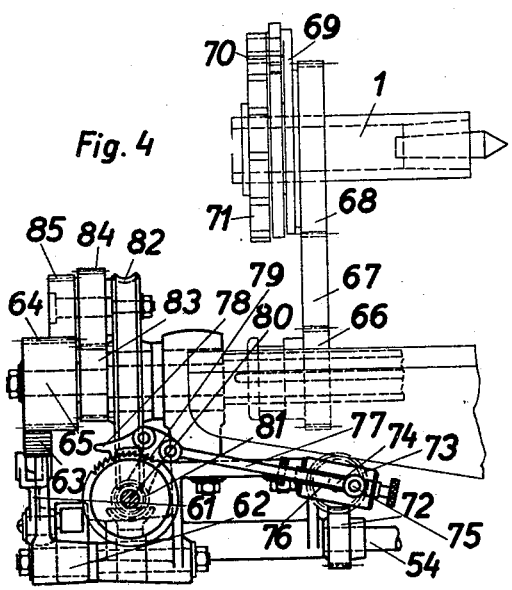

One constructional form of the invention is illustrated by way of example in the accompanying drawings, in which Figure 1 is a front elevation, Figure 2 an end view thereof, looking in the direction of the arrow in Figure 1, Figures 3 and 4 show the feed gear in end elevation and in front elevation respectively.

Figure 5 is a detail view of the change gear of the clutch for the reciprocatory movement of the spindle holder, and Figure 6 is a general view of a machine provided with the device according to the invention.

The tool spindle 1 is supported in bearings 1' which extend upwards from the slide 2, as shown in Figures 3 and 6. This slide is displaceable in the longitudinal direction of the spindle axis upon the carriage guide 3 of the machine bed. The longitudinal displacement is obtained from the driving shaft 4 (Fig. 2) by means of a spindle 5, suitable intermediate wheels or the like being provided. The driving shaft 4 revolving continuously in the same direction, transmits its rotation to the spindle 5 by means of the change gear of known construction, of which the clutch member 6, by sliding along the shaft 4, is so connected with the drive that a rotation either in the same or in the reverse direction is transmitted to the spindle 5.

To the clutch sleeve 6 is attached a lever 7, which is secured to a pivot 8. This pivot is supported at 9 on the machine frame. Upon it is secured a lever 19, with a stop 20

(Fig. 1), while likewise upon the pivot 8 a double lever 10 is mounted loose. To the free end of the latter, provided with a transverse pin 11, is attached a spring 12, which is secured at the other end to a transverse pin 13 on a second lever 14. This lever is mounted upon a pivot 15, which is parallel to the pivot 8. The two levers 10 and 14 are equipped at the end remote from their pivots with interengaging toothed sectors 16 and 17, so that they are constrained to oscillate together.

To the tool spindle holder 2 are secured two stops 18.

In the position of the parts illustrated in Fig. 1 it is assumed that the spindle holder 2 has nearly completed its movement from left to right. The left-hand stop 18 is then about to come into contact with the free end of the lever 10, and to carry it along. Upon the stop 18 meeting the double lever 10, the same is thrown over towards the right, this being done positively by the stop 18 right into its mid position. If it has passed slightly beyond the mid position, the spring 12 exerts its action as a tilting and locking mechanism. At this moment the double lever 10 strikes with its stop $x$ against the stop 20 on the lever 19 and throws the latter over towards the right, whereby at the same time the lever 7, owing to its deflection, takes the clutch member 6 with it, and accordingly throws over the reversing gear automatically. The slide will accordingly reverse and move from right to left until the right-hand stop 18 comes into contact with the end of the double lever 10, takes the latter with it and throws it over to the other side. The stop $x'$ then strikes against the stop pin 20 mounted on the lever 19. With the lever 19, however, is thrown over the lever 7 connected therewith, whereby the clutch member 6 is actuated, which results in a corresponding reversal. In this way the series of operations is renewed in a manner known in itself.

On the machine frame is oscillatably arranged about a bolt 24 a ratchet lever 25, to the free end of which is attached a spring 26, which constantly tends to pull the ratchet lever down on to the stop 20 on the lever 19. For the stop 20 a notch 27 is hollowed out in the lever 25 in such a way that the stop 20 can pass into the notch 27 when the lever 19 is located in the middle of its oscillatory movement.

In order that the lever 25 may only drop when the lever 19 shifts from left to right, and may therefore remain in its position when the lever 19 rocks in the opposite direction, there is provided on the right-hand stop 18 a bar 18′, shown in Figs. 5 and 6, which engages under a pin $y$ provided on the lever 25 shortly before the end of the movement of the slide from right to left, so that during the ensuing rocking movement of the lever 19 the lever 25 cannot descend, so the stop 20 cannot pass into the notch 27 in the lever 25.

If, on the contrary, the slide 2 moves out of the position shown in Figure 1 still farther towards the right, the left-hand stop 18 then takes the lever 10 towards the right with it. The stop 20 then moves into the notch 27, so that the lever 25 can deflect downwards in accordance with the pull of its spring 26. A lever 28 connected with the lever 25 for rotation about the bolt 24 is thereby rotated with it, so that a thrust rod 29 pivoted thereto can cause the lever 30 to deflect upon a pivot 31. Upon this pivot 31, which passes transversely through the machine frame, is mounted at the other end a lever 32, also shown in Figure 2, from which there extends upwards a thrust rod 33, which terminates in a longitudinal slot 34. In this longitudinal slot there engages a pin 35, which projects transversely to a ram 36. This ram is guided by its end equipped with a roller 37 in a cam groove 38 of a cam disc 39, in such a way that the ram, at every revolution of the shaft upon which the cam disc 39 is mounted, reciprocates once. The offset end of the ram 36 is intended for the purpose of co-operating with a square pin stop 40 on a swing lever 41, which is rotatably supported on the frame at 42, and the deflection of which towards the left is limited by a stop pin 43. The free end of this lever is equipped with a roller 44, which acts against a collar 45 on a longitudinally displaceable clutch member 46. The clutch member is slidably but non-rotatably mounted upon a pivot 47, to which the cam disc 39 is secured. A spring 48 coiled round this shaft tends to press the clutch member 46 constantly towards the left into the position shown in Figure 1. The shaft 47 is driven from the driving shaft 49 by spur wheel counter-shaft gearing 50, 51.

So long as the ratchet lever 25 is in the raised position, that is to say, so long as the stop 20 has not entered the notch 27, the adjustment of the rodding connected with it holds the rod 33 in the raised position. The ram 36 is thereby also raised, so that its end cannot come into contact with the stop pin 40. The ram therefore executes an idle movement.

Hence when the stop 20 has dropped into the notch 27 in the spring lever, which therefore happens when the lever 19, at the end of the carriage movement from left to right, is rocked by the stop 18 by means of the lever 10, the clutch member 6 of the reversing gear is then located in the neutral position, so that from the driving shaft 4 no movement is transmitted to the spindle 5, and accordingly the slide 2 is stationary. At the same time however the rod 33 is lowered and the ram 36 is brought into the path of the stop pin 40. Accordingly the ram begins to act, and it presses the lever 41, and therefore also the clutch member 46, towards the right, against the action of the spring 48. The toothed wheel 52 mounted upon the clutch member therefore comes into mesh with a toothed wheel 53 upon a feed shaft 54. The feed shaft is therefore set in rotation, but in the course of the said rotation of the cam shaft 47 the ram 36 is taken back again, and the toothed wheel 52 is thereby brought out of engagement with the toothed wheel 53 again by the action of the spring 48. At the termination of the revolution of the feed shaft 54 a cam 55 connected therewith comes into engagement with the free end of the lever 56, which is secured to the pivot 31. The cam causes the lever 56 to deflect in such a direction that the rodding extending from the pivot 31 disengages the ratchet lever 25 against the action of its spring 26. The stop 20 is thereby set free and the complete deflection of the double lever 10 and of the lever 14 can now take place under the influence of the lever 19, the spring 12 exerting a tilting locking action, so that the pivot 8 is caused to move into the operative position in the direction of the displacement of the clutch member 6 of the reversing gear. The reversal of the movement of the slide takes place. The slide now moves from right to left, as looked at in Figure 1. Finally the right-hand stop 18 then comes into engagement with the end of the double lever 10 and throws over this lever with the assistance of the lever 19. With this throwing over of the lever 19 from right to left the ratchet lever 25 cannot drop, because, as already stated above, the bar 18' on the right-hand stop 18 prevents this. It is therefore not possible now to affect the rodding 28 to 33. The clutch member 6 is carried along thereby, and the reversing gear actuated in such a sense that the slide is now reversed and again goes back from left to right, the series of operations thus beginning afresh.

To the feed shaft 54 is secured a crank disc, shown in Figure 3, of which the crank pin 57 engages in a slotted crank guide 58. The connecting rod 59 extending from the crank guide is pivoted at 60 to a swing lever 61, which is mounted for oscillation about a frame bolt 62, and terminates in a toothed sector 63. The toothed sector is thus swung to and fro by the crank guide. It meshes with a spur wheel 64 upon a pivot 65. From this pivot, by means of spur wheel countershaft gearing 66, 67, 68, the rotation is transmitted to a feed pawl holder 69 freely rotatable about the spindle 1, the feed pawl 70 of which engages with a ratchet wheel 71 secured to the spindle 1, in such a way that during rotation in one direction the ratchet wheel is fed one tooth forward, while during rotation in the other direction the pawl slides idly over the teeth.

Now in order to allow for wear of the grinding wheel during the rotation of the workpiece, there is provided upon the feed shaft 54, as shown in Figs. 3 and 4, a worm 72, which meshes with a worm wheel 73, which is secured to a shaft 74. Upon a crank disc carried by the shaft 74 is mounted a crank pin 75, which engages with a slotted crank guide 76, the connecting rod 77 of which actuates ratchet gearing, of which the pawl is denoted by 78 and the ratchet wheel by 79. The ratchet wheel 79 is mounted upon a shaft 80, to which is secured a worm 81, which meshes with a worm wheel 82. On the worm wheel 82 are supported by means of a screw bolt two spur wheels 84 and 85, which are rigidly connected with one another. Now while the spur wheel 84 meshes with a spur wheel 83 mounted fast upon the shaft 65, the spur wheel 85, co-operates with the spur wheel 64, mounted loose upon the shaft 65. Now since, at the same time at which the toothed segment 63 is oscillated, the worm wheel 82 is also rotated by the ratchet gearing 78, 79, and therefore at the same time a rolling of the spur wheel 85 upon the spur wheel 64 takes place, the rotation of the spur wheel 64 upon the shaft 65 is transmitted from here to the ratchet gearing 70, 71 with a lag or a lead, according as the worm wheel 82 is rotated in the direction of rotation of the spur wheel 64 or in the opposite direction. In other words the result is obtained that during the work of feeding, a subsidiary feed through quite a small distance occurs, in such a way that the workpiece is rotated in accordance with the wear of the grinding tool, in order that the tool may always be uniformly machined in relation to the subdivision of the cutting edges.

What I claim is:—

1. A machine for grinding tools, comprising a work spindle, a work spindle holder reciprocable in the longitudinal direction of the work spindle, means for rotating the work spindle according to the curvature of the edge of the tool to be ground, means for feeding the work spindle after each reciprocation of the work spindle holder, a driving shaft, reversible transmission gear adapted to connect the work spindle holder with the driving shaft for displacement in the longitudinal direction of the work spindle and for the spindle rotation, a clutch for actuating the reversible transmission gear, a second clutch for releasably connecting the work spindle feeding means with the driving shaft, means for automatically releasing the first clutch when the work spindle reaches one end of its travel, means for automatically engaging the first clutch when the work spindle reaches the other end of its travel, and means for automatically engaging the second clutch when the first clutch is released and releasing the second clutch when the first clutch is engaged.

2. A machine for grinding tools, comprising a work spindle, a work spindle holder reciprocable in the longitudinal direction of the work spindle, means for rotating the work spindle according to the curvature of the edge of the tool to be ground, means for feeding the work spindle after each reciprocation of the work spindle holder, a driving shaft, reversible transmission gear adapted to connect the work spindle holder with the driving shaft for displacement in the longitudinal direction of the work spindle and for the spindle rotation, a clutch for actuating the reversible transmission gear, a second clutch for releasably connecting the work spindle feeding means with the driving shaft, means for automatically shifting the first clutch into the inoperative position when the work spindle reaches one end of its travel, a spring constantly tending to shift the first clutch into the operative position, a catch adapted to hold the first clutch in the inoperative position against the action of the spring, a continuously revolving shaft connected with the work spindle feeding means, means for disengaging the catch upon the completion of each revolution of the said continuously revolving shaft, rodding adapted to shift the second clutch into the operative position when the catch holds the first clutch in the inoperative position, and means for shifting the second clutch into the inoperative position when the first clutch becomes operative.

3. Tool grinding apparatus as claimed in claim 2, characterized by the feature that to the clutch sleeve (6) of the first clutch constructed as reversing gear is attached a lever (7), upon the pivot (8) of which are mounted stop levers (10 and 19), which latter is thrown over during the reciprocation of the spindle holder, the free end of this lever being connected with the free end of a second lever (14) arranged upon a parallel pivot (15) by a tension spring (12), and the two lever hubs being connected with one another by toothed segments (16, 17) in order thus to form a snap-action mechanism, which is held fast in the neutral position by the spring catch (25).

4. Tool grinding apparatus as claimed in claim 2 characterized by the feature that the spring catch (25) is constantly pulled by a spring (26) to engage with a lever-like ratchet tooth (19, 20) mounted upon the control shaft (8) of the coupling means, a notch (27) being provided in the spring lever for this tooth, which notch however is disengaged by the rodding (28—31) attached to the spring lever and controlled from the feed shaft each time after the termination of a revolution of the feed shaft.

5. Tool grinding apparatus as claimed in claim 2, characterized by the feature that from the driving shaft (47) of the feed mechanism a tappet (36) continually reciprocates, but by the rodding (32, 33) connected with the spring pawl of the first clutch is held out of engagement with a stop (44) until the pawl drops in, after which the reciprocating ram (36) passes within reach of the stop (44) and thereby displaces the clutch member (40) of the second clutch in such a way that the driving shaft (47) passes into engagement with the feed shaft of the spindle feed mechanism.

6. Tool grinding apparatus as claimed in claim 1, characterized by the feature that upon the feed shaft (54) is arranged a crank pin (57), the connecting rod (59) of which is attached to a swing lever (61) constructed as a toothed sector, by the swinging to and fro of which a ratchet-and-pawl gear (70, 71) is fed one division with the interposition of a suitable transmission.

7. Tool grinding apparatus as claimed in claim 1, characterized by the feature that from the feed shaft is driven a ratchet-and-pawl mechanism (78, 79), which acts with a large transmission ratio upon the spindle, in order to impart to the latter a small supplementary rotation for the purpose of maintaining the grinding pressure in correspondence with the wear of the grinding tool and of the cutting edge of the tool.

In testimony whereof I have signed my name to this specification.

KURT METZLER.